United States Patent [19]

Gordon

[11] 4,273,149
[45] Jun. 16, 1981

[54] BLIND PRESSURE PILOT

[76] Inventor: David R. Gordon, P.O. Box 591, Harvey, La. 70058

[21] Appl. No.: 958,738

[22] Filed: Nov. 8, 1978

Related U.S. Application Data

[63] Continuation-in-part of Ser. No. 874,429, Feb. 2, 1978, abandoned.

[51] Int. Cl.³ .............................................. G05D 16/00
[52] U.S. Cl. ............................................. 137/83; 91/3
[58] Field of Search ................................. 137/83; 91/3

[56] References Cited

U.S. PATENT DOCUMENTS

| | | | |
|---|---|---|---|
| 2,390,301 | 12/1945 | Hart | 137/83 UX |
| 2,921,595 | 1/1960 | Erbguth | 137/83 X |
| 3,606,902 | 9/1971 | Shinn | 137/83 |
| 3,633,604 | 1/1972 | Klee | 137/83 |

*Primary Examiner*—Alan Cohan
*Attorney, Agent, or Firm*—Keaty, Keaty & Garvey

[57] ABSTRACT

A blind pressure pilot apparatus provides a supportive base having a pressure responsive bourdon tube mounted on the base for sensing pressure within a connected test vessel. A pair of indicating arms are movably mounted on the bourdon tube upon a shaft mount which is attached to the bourdon tube and generates a rotation of the shaft responsive to pressure changes in the bourdon tube and the test vessel. Changes in pressure produce pivotal movement of each indicating arm which arms can be spaced to cover a desired span. A gap sensor is mounted upon the supportive base and provides a gap having a continuous stream of instrumentation gas flowing across the gap. During pivotal movement, each of the indicating arms generates an arcuate path, a portion of which intersects the gap and flowing stream of instrumentation gas. During such interruption, the flow of instrumentation gas is halted, which can produce desirable signals for operating valves, and performing like pneumatic instrumentation tasks.

6 Claims, 6 Drawing Figures

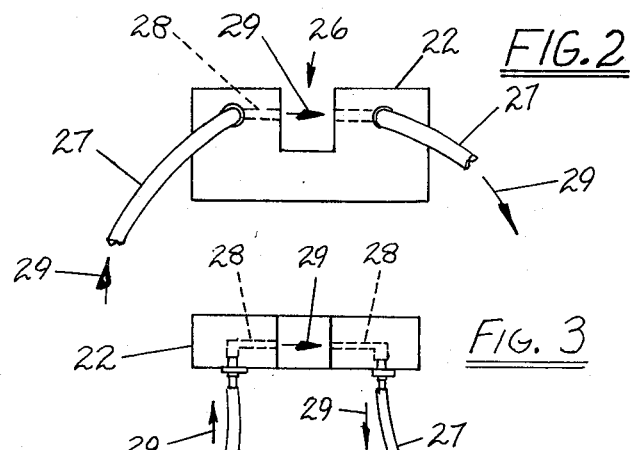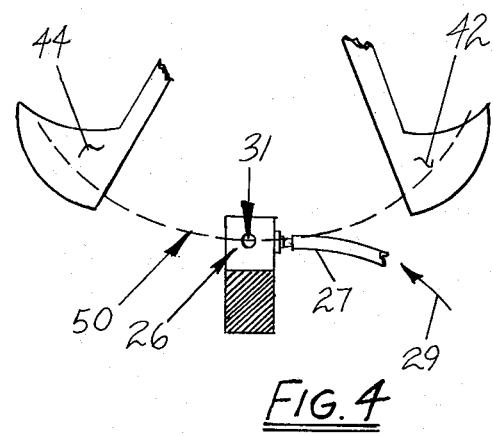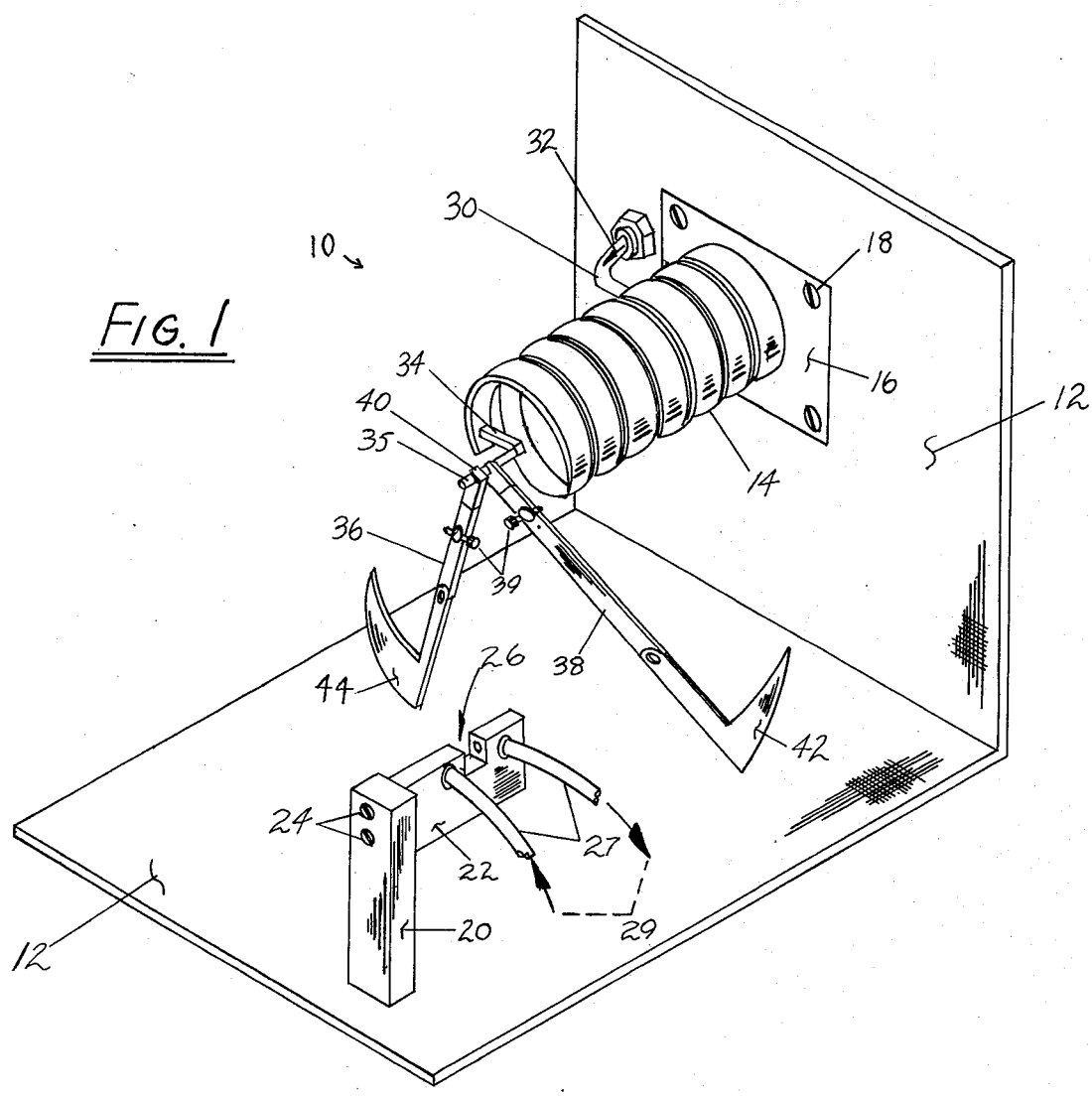

BLIND PRESSURE PILOT

REFERENCE TO RELATED APPLICATION

This is a continuation in part of applicants co-pending patent application, U.S. Ser. No. 874,429, filed Feb. 2, 1978 now abandoned.

BACKGROUND OF THE INVENTION

1. Field of the Invention

The present invention relates to pneumatic pressure controllers, and more particularly relates to a blind pressure pilot apparatus wherein a continuous stream of instrumentation gas is interrupted by movable indicating arms mounted directly to a bourdon tube which arms move in an arcuate path responsive to changes in pressure producing rotation of the bourdon tube.

2. General Background and Prior Art

In the operation of chemical plants, and similar industrial complexes, there is a need to maintain certain elements of the industrial system or device in a certain position.

As an example, it may be desirable to keep a valve open and a pipeline as long as the pressure within the pipeline is above a certain value or below a certain value. In a like manner, it may be desirable to maintain a valve in an open position as long as a desired minimal temperature is maintained and as long as a desired maximum temperature is not exceeded. As long as there is a suitable device for the measuring of such a parameter as temperature pressure or the like, these values can readily be measured and the devices can be used to trigger the valves or like devices in the event that the parameter exceeds desired operating range. Bourdon tubes are often used for the measuring of pressure in pneumatic systems such as is seen in the case of gas instrumentation. It is to this general field that the present invention is directed.

The present invention utilizes a suitable parameter responsive device such as a bourdon tube to operate a responsive sensor which can shut off a desired system such as a valve, in the event that a desired maximum or desired minimum parameter such as excessive or inadequate pressure is reached.

Controllers are broadly known, it is known to operate controls by means of various parameters such as pressure or temperature. In the prior art, a source of control area is utilized in many instances to keep a certain control mechanism in an operative position. When a desired maximum or minimum condition is achieved, the control it shifts to close a valve are similar systems. Many prior art type controls require a constant and/or tightly controlled input of control area in order to operate properly. If the input of control air varies greatly, the system will fail.

Applicant's co-pending prior patent application (U.S. Ser. No. 874,429, entitled "On-Off Control Movement") provides a control mechanism which does not require a certain tightly controlled input of control air in order to operate the instrumentation properly.

The present application provides a pressure responsive indicator such as a bourdon tube to which is directly mounted without movable linkage a pair of indicating arms which directly rotate with and responsive to the expansion of the bourdon tube which produces a rotation.

GENERAL DESCRIPTION OF THE PRESENT INVENTION

The present invention provides a blind pressure pilot apparatus which is comprised of a supportive base having a pressure responsive means such as a bourdon tube set on the base which in pneumatically connected to a test vessel or like pressurized vessel which is desired to be tested for pressure. Mounted to the end portion of the bourdon tube is a pair of indicating arms which are movably mounted on a mount provided at the tip portion of the bourdon tube. Expansion of the bourdon tube responsive to pressure creates a rotation of mount and a corresponding pivotal movement of each indicating arm. A gap sensor is associated with and mounted on the supportive base which provides a gap across which flows a continuous stream of instrumentation gas. As the indicating arms move pivotally responsive to pressure changes of the bourdon tube, the end portion of each indicating arm intersects the continuous stream of flowing instrumentation gas interrupting the flow as is desirable. As will be understood by one skilled in the art, the interruption of the continuous stream of flowing instrumentation gas provides a discontinuity which can be used for closing valves, or like instrumentation purposes. Since a continuous stream of flowing fluid is provided, there is no necessity for a certain pressure to be maintained in the flowing stream. In the preferred embodiment, the bourdon tube is arranged so that it's central axis is substantially parallel to the central axis of the flowing stream of instrumentation gas. Each indicating arm is pivotally attached at substantially right angles to the bourdon tube and it's end portion is equipped with an arcuately shaped interrupting flag which generates an arcuate path during pivotal movement of the indicating arm. The arcuate path of each interrupting flag member intersects at one point the stream of flowing instrumentation gas. Each indicating arm can be adjustably moved on the bourdon tube mount to a preset span. Thus, the bourdon tube and it's attached indicating arms can be callibrated prior to the placement of the device into operation with a pressure generating test vessel.

BRIEF DESCRIPTION OF THE DRAWINGS

For a further understanding of the nature and objects of the present invention, reference should be had to the following detailed description, taken in conjunction with the accompanying drawings, in which like parts are give like reference numerals and wherein:

FIG. 1 is a perspective view of the preferred embodiment of the apparatus of the present invention;

FIG. 2 is a side view of the gap sensor portion of the preferred embodiment of the apparatus of the present invention;

FIG. 3 is a top view of the gap sensor portion of the preferred embodiment of the apparatus of the present invention;

FIG. 4 is a sectional view of the gap sensor portion showing partially the interrupting flag members.

DETAILED DESCRIPTION OF THE PREFERRED EMBODIMENT

Figure 5:
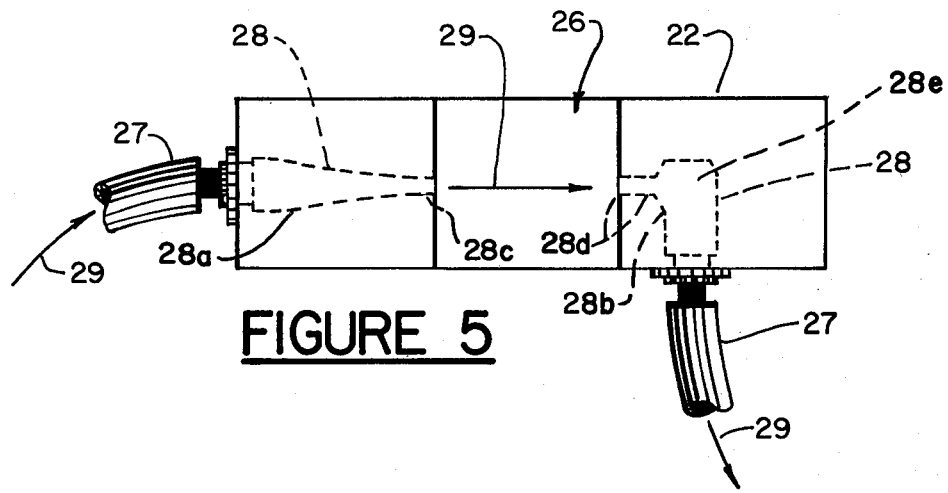
FIG. 5 is a sectional view of the gap sensor portion of the preferred embodiment of the apparatus of the present invention.

FIG. 1 best illustrates the preferred embodiment of the apparatus of the present invention designated generally by the numeral 10 in FIG. 1. Blind pressure pilot 10 is comprised generally of a supportive base 12 upon which is mounted an indicating unit which in FIG. 1 and in the preferred embodiment is bourdon tube 14. Bourdon tube 14 is attached to the mounting plate 16 which can be affixed to base 12 by means of screw fasteners 18 or the like. A gap sensor body 22 is mounted to base 12 by means of gap sensor mount pedestal 20 to which gap sensor body 22 is attached by use of screw fasteners 24 or like suitable connections.

The end portion of bourdon tube 14 opposite it's point of attachment to base 12 is provided with an attached indicator mount arm 34 to which is attached a mount shaft 35.

Figure 6:
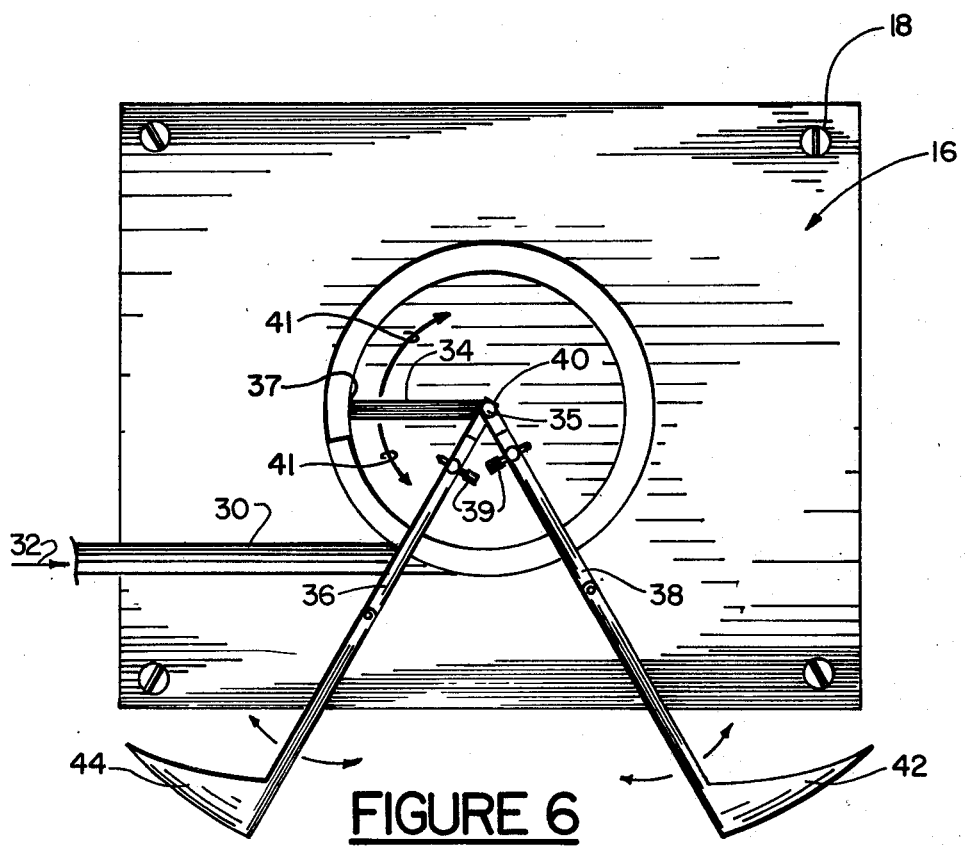
FIG. 6 is a partial top view of the preferred embodiment of the apparatus of the present invention.

Indicator mount arm 34 extends from its attachment at point 37 of bourdon tube 14 inward to the approximate center of rotation of bourdon tube 14 which is substantially coincident with the central axis of mount shaft 35 (See FIG. 6). It will be seen from the above, that a rotation in bourdon tube 14 generated by an expansion or contraction responsive to pressure change will generate a movement in bourdon tube 14 at it's extreme end portion 37 and a corresponding pivotal movement of mount arm 34 and a corresponding rotation of mount shaft 35 (See arrows 41, FIG. 6). It is desirable that mount shaft 35 be thus mounted substantially coincident with the central axis of bourdon tube 14 which will be the approximate center of rotation of bourdon tube 14 and the pivot point for mount arm 34. Thus, an increase in expansion of bourdon tube 14 produced by an increase in pressure from the test vessel (not shown) and through conduit 30 will produce a rotation of shaft 35 and a corresponding pivotal movement in indicator arms 36, 38 as will be discussed more fully hereinafter. Note that each indicator arm 36, 38 is directly affixed to shaft 35. The connection of each indicator arm 36, 38 to shaft 35 can be by means of openings in the end portion of each indicating arm 36, 38 which are substantially equal to or slightly larger than the diameter of shaft 35 so that a frictional, yet movable connection is provided for each indicating arm 36, 38 upon shaft 35.

In FIG. 1, supportive base 12 is substantially ell-shaped, the base comprising generally a lower base portion upon which gap sensor pedestal 20 is attached and an upper base portion connected substantially at right angles to the lower base portion, the upper base portion providing the surface for the attachment of bourdon tube 14 thereto.

Note from an inspection of FIG. 1 that gap sensor body 22 is provided with a gap 26.

FIGS. 2-4 and 5 illustrate more particularly the structure and function of gap 26 and gap sensor body 22.

An inspection of FIGS. 2 and 3 will reveal that an inner gap bore 28 is provided which flows through gap body 22 as is best illustrated by phantom lines in FIGS. 3 and 5. Gap 28 enters gap body 22 and flows across a portion of gap 26 as is illustrated best in FIGS. 2, 3 and 5. Air-flow lines 27 are attached to gap bore 28. Arrows 29 in FIGS. 1, 2, 3 and 5 illustrate a flow of control air through gap bore 28 in a circulating fashion. Note that air enters gap bore 28 through one air flow line 27 and exits from the other. It should be understood that control air could be made to flow in either direction through gap bore 28 as is illustrated in FIGS. 2 and 3.

FIG. 4 presents a side sectional view through gap 26 illustrating the interruption of the continuous flow of control air 29 through gap bore 28 by flags 42, 44. As can best be seen in FIG. 1, a pair of indicating arms 36, 38 are provided and attached pivotally and frictionally to mount shaft 35. Suitable fine adjustments 39 are provided to each indicating arm 36, 38. The lowermost end portion of each indicating arm 36, 38 is provided with a substantially arcuately shaped interrupting flag member 42, 44. As will be described more fully with respect to FIG. 4, each flag member moves through an arcuate path 50 responsive to pressure changes in a test vessel which may be connected to bourdon tube 14 through conduit 30. In FIG. 1, arrow 32 illustrates the presence of pressure being transmitted through conduit 30 to bourdon tube 14, from a test vessel not shown. It should be understood that any test vessel could be connected by suitable tubing or the like as is known in the art to bourdon tube 14 so that a pressure within the test vessel could be sensed and the bourdon tube be activated.

An increase or fluctuation of pressure within a test vessel and transmitted as indicated by arrow 32 through conduit 30 to bourdon tube 14 will cause bourdon tube 14 to expand with a corresponding movement and generally pivotal rotation of indicator mount arm 34 which produces a rotation of mount shaft 35. Indicator arms 36, 38 which are mounted frictionally and pivotally to mount shaft 35 will move responsive to the change in pressure as afore described. The pivotal movement of each indicating arm 36, 38 produces a corresponding arcuate travel with it's attached interrupting flag member 42, 44.

The frictional attachment of each indicator arm 36, 38 to mount shaft 35 is a frictional fit which normally holds each indicating arm 36, 38 to shaft 35. Thus when bourdon tube 14 produces a rotation of shaft 35, a corresponding pivotal movement will be produced in each attached indicating arm, 36, 38. The attachment of each arm 36, 38 to mount shaft 35 is frictional, and can be overcome by minimal pressure exerted by the hand, for example, of an operator who would adjust the apparatus 10 by supplying known pressure to bourdon tube 14 through conduit 30 and presetting each indicating arm at desired minimal or maximum test pressures.

In FIG. 4, the arcuate path 50 traveled by each extreme interrupting flag member 42, 44 is seen. Note that the arcuate shape of each flag member 42, 44 interrupts through a portion of it's length the continuous stream 29 of air flowing through bore 28 (see FIG. 3). Thus, flags 42, 44 and indicating arms 36, 38 tend to be preset to shut off the continuous stream 29 of control fluid leaving orifice 31 and traversing gap 26 at certain desired preset pressures. Thus, a blind pressure pilot is provided by the present invention. Since a continuous stream 29 of control fluid across the gap 26 is provided for instrumentation purposes, it will be understood by one skilled in the art that minor variations in the pressure of the continuous stream 29 will not effect performance the unit 10.

Note from an inspection of FIG. 1 that each indicating arm 36, 38 is generally parallel to the upper base portion of supportive base 12. Note also that the continuous stream 29 of control fluid across gap 26 is generally perpendicular to each flag member 42, 44. In the same manner, gap body 22 is generally aligned with the stream of control fluid 29 across gap 26.

FIG. 5 illustrates an alternate structure to gap sensor 22, specifically conduit 28. In FIG. 5, conduit 28 would be comprised of an entrance conduit 28a and an exit conduit 28b. Entrance conduit 28a would be generally conical, having a discharge orifice 28c. Exit orifice 28d would be equal to or preferably slightly larger in diameter than entrance orifice 28c. An enlarged section 28e after exit orifice 28c would be provided as turbulence at that point in the flow is not a problem. The embodiment of conduit 28 shown in FIG. 5 has been found to reduce deadband.

To install pressure pilot 10 for a typical installation, the desired minimal and maximal operating pressures would be selected. As an example, assume that a maximum test pressure of twenty pounds per square inch (20 lbs. psi) would be suitable and a maximum of 100 psi. A suitable test vessel such as a testing pump, or compressor could be attached to bourdon tube 14 by threadably attaching or making a similar connection to conduit 30. The compressor or pump would then be raised to a pressure of 20 psi at which time indicating arm 38 would be set with the innermost surface portion of interrupting flag 42 being aligned with gap bore 28 and the continuous stream of control air 29. An increase in pressure of the compressor or pump, or like pressure producing test vessel would be generated to a pressure of 100 psi which would produce an expansion and rotation of bourdon tube 14 in a generally clockwise direction. At this point, (100 psi test pressure) the innermost edge portion of flag 42 with respect to gap sensor body 22 would be aligned with gap bore 28 and the continuous stream of control air 29 flowing therethrough.

With the device so callibrated, it could be installed on any test vessel such as a fluid flow line, pressure vessel, instrumentation line, or the like and would interrupt the flow of continuous control fluid through gap bore 28 whenever a minimum pressure of 20 psi was not maintained or whenever a maximum pressure of 100 psi was exceeded.

The blind pressure pilot 10 of the present invention could be manufactured of any suitable structural material such as stainless steel or the like. Bourdon tubes such as bourdon tube 14 are known in the art and can be manufactured of stainless steel and purchased through any supplier of instrumentation equipment. Indicating arms 36, 38 and flags 42, 44 could likewise be provided of stainless steel or the like as could be mount shaft 35 and mount arm 34.

Gap sensor pedestal 20 and gap body 22 could be likewise provided of any suitable structural metal such as stainless steel. Flow lines 27 could be provided of plastic, copper, stainless steel, or the like.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. A blind pressure pilot apparatus comprising:
 a. a substantially ell-shaped supportive base, said base comprising a lower base portion and an upper base portion connected thereto at substantially right angles;
 b. a pressure responsive bourdon tube mounted on said upper base portion and extending therefrom substantially parallel to said lower base portion;
 c. an indicating arm mount attached to the projecting end portion of said bourdon tube, said indicating arm mount comprising a pivot arm connected at one end portion thereof to said bourdon tube and a shaft attached to the other end portion of the pivot arm, said shaft having it's central axis generally aligned with the central axis of said bourdon tube, said shaft rotating responsive to pressure changes within said bourdon tube;
 d. a pair of indicating arms pivotally and frictionally attached to said indicating arm mount shaft portion each of said indicating arms being independently, pivotally movable on said shaft, each of said arms providing an extreme interrupting flag member at it's end portion away from said shaft, said flags thus moving through and defining a generally arcuate path, each of said interrupting flag members traveling generally through said defined arcuate path responsive to pressure changes within said bourdon tube, said arcuate path generally parallel with said upper base portion; and
 e. a gap sensor providing a stream of continuous control air flowing across a portion of said defined arcuate path, said gap sensor body comprising,
  i. a gap sensor body attached to said lower base portion;
  ii. a gap formed in said gap sensor body, and projecting across a portion of said gap,
  iii. a gap bore provided in said gap sensor body and projecting across a portion of said gap and said defined arcuate path,
  iv. a supply stream of control air flowing through said gap bore and across said gap and said arcuate path, the registration of one of said flag members with said supply streams causing an interruption of said supply stream at said gap.
2. A blind pressure pilot apparatus comprising:
 a. a supportive base;
 b. pressure responsive means on said base for sensing pressure within a test vessel, said pressure responsive means comprising at least in part a curved bourdon tube, said tube defining a central axis;
 c. means for pneumatically connecting said sensing means and the test vessel;
 d. indicating means movable mounted on said pressure responsive means for indicating changes in pressure within the test vessel said indicating means comprising:
  i. an indicating arm mount attached to the projecting end portion of said bourdon tube and extending inwardly toward said central axis of said bourdon tube,
  ii. a shaft on the innermost end portion of said arm mount and substantially coincident with said bourdon tube central axis,
  iii. an indicating arm attached during use to said shaft, said arm having an end portion which during operation traverses a curved path; and
 e. gap sensor means associated with said indicating arm for providing a stream of flowing instrumentation gas, said gap sensor means and said indicating arm being movable with respect to one another, said indicating arm being capable of interrupting said stream of instrumentation gas as said indicating arm moves responsive to pressure changes in the test vessel.

3. The blind pressure pilot apparatus of claim 2 wherein said arm is provided with an arcuate flag at one extreme end portion opposite the point of attachment of said arm to said mount, said flag member being generally arcuate in shape and corresponding generally in shape to the arcuate path through which said flag moves responsive to pressure changes in said bourdon tube.

4. The blind pressure pilot apparatus of claim 3 wherein two of said arms are provided, each being movable adjustable to provide a space between the respective flag portions of each arm member, said space defining a span of operation of said gap sensor means, said gap sensor means providing said stream of flowing instrumentation gas when said flag portions of said arms are removed from said gap sensor means, the placement of one of said flag portions adjacent to said gap sensor means producing an interruption of said stream of flowing instrumentation gas.

5. The blind pressure apparatus of claim 2 wherein said gap sensor means is comprised of:
  a. a gap sensor body attached to said base;
  b. a gap formed in said gap sensor body;
  c. a gap bore provided in said gap sensor body, and projecting across a portion of said gap; and
  d. a fluid control pressure supply means for flowably providing a stream of control air fluid through said gap bore.

6. The blind pressure pilot apparatus of claim 2 wherein said connecting means is a conduit pneumatically connecting said pressure responsive means and the test vessel.

* * * * *